United States Patent
Ollis et al.

(10) Patent No.: US 6,859,611 B2
(45) Date of Patent: Feb. 22, 2005

(54) COMPUTER IMPLEMENTED METHOD OF SELECTIVELY RECORDING AND PLAYING BROADCAST PROGRAM CONTENT

(75) Inventors: Jeffrey D. Ollis, Dresher, PA (US); David T. Horoschak, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 67 days.

(21) Appl. No.: 10/618,158

(22) Filed: Jul. 11, 2003

(65) Prior Publication Data

US 2005/0008325 A1 Jan. 13, 2005

(51) Int. Cl.[7] .............................................. H04N 5/91
(52) U.S. Cl. ............................ 386/46; 386/126; 360/7
(58) Field of Search ............................... 386/1, 46, 83, 386/125, 126; 360/7; 725/22, 40, 48; 348/563

(56) References Cited

U.S. PATENT DOCUMENTS 6,311,011 B1 * 10/2001 Kuroda ........................ 386/46
6,591,292 B1 * 7/2003 Morrison et al. ............. 725/22
6,600,503 B2 * 7/2003 Stautner et al. .............. 725/40
6,813,776 B2 * 11/2004 Chernock et al. ............ 386/83

* cited by examiner

Primary Examiner—Thai Tran
Assistant Examiner—Christopher Onuaku
(74) Attorney, Agent, or Firm—Akin Gump Strauss Hauer & Feld, LLP

(57) ABSTRACT

A computer-implemented method of selectively recording and playing the content of a broadcast program includes playing on a media player one of a plurality of prestored files which include program content. A broadcast program is received and it is determined whether a predetermined criteria associated with the broadcast program is met. If the predetermined criteria is met, at least a portion of content of the broadcast program is automatically recorded. The recorded content of the broadcast program on the media player is then automatically played, either immediately after being recorded or at the end of playing the one prestored file.

12 Claims, 3 Drawing Sheets

COMPUTER IMPLEMENTED METHOD OF SELECTIVELY RECORDING AND PLAYING BROADCAST PROGRAM CONTENT

BACKGROUND OF THE INVENTION

1. Field of the Invention

The present invention relates generally to receiving and playing a broadcast program while listening to other program content in a prestored format.

2. Background Information

Drivers often receive traffic, weather and/or other informational reports while listening to the radio in their vehicle. When drivers are listening to live radio broadcast programming, the timing of such informational reports is usually not important since the driver is listening to whatever broadcast program is being transmitted at that given instant from the radio station. That is, since the radio station controls the broadcast programming, the radio station also controls when to broadcast informational reports and if (and when) to interrupt the station's live broadcast programming to do so. However, many drivers prefer listening to prerecorded music or other material instead of live broadcast programming. To accommodate this class of radio consumer, radio stations have historically aired traffic and weather reports at specific, designated times, thereby allowing drivers to switch from either another radio station or the prerecorded programming to the radio station airing the informational report at the designated time so the driver is able to listen to the report. Subsequent technology (such as that supported by Blaupunkt automobile radio receivers) has allowed radio stations to include an inaudible signal(s) with the broadcast programming including the informational report, whereby the driver's radio receiver, upon detecting the inaudible signal from the station to which it is tuned, turns off (or otherwise temporarily disables) the tape or compact disc ("CD") player, and selects the radio to be played so that the driver can listen to the live informational report being broadcast from the station.

Both types of technology have been unacceptable to drivers. In the first instance, the driver must pay attention to the time and appropriate station on which the informational report will be broadcast, while also paying attention to the road and the prerecorded programming. Furthermore, if the driver forgets to tune in to the appropriate station at the designated time, the driver will miss the potentially important content of the informational report. Using the automatic interrupt technology (e.g., Blaupunkt), the prerecorded program to which the driver is listening is automatically interrupted to receive and play the incoming informational report at what may be an inopportune time to disrupt the driver's prerecorded programming.

The present invention allows the user to listen to traffic, weather and other informational reports at natural breaks in the prerecorded programming that the driver is listening to.

BRIEF SUMMARY OF THE INVENTION

According to a first aspect of the present invention, a computer implemented method of selectively recording and playing the content of a broadcast program includes playing on a media player one of a plurality of prestored files which include program content, receiving a broadcast program and determining whether a predetermined criteria associated with the broadcast program is met. If the predetermined criteria is met, at least a portion of the content of the broadcast program is automatically recorded. The recorded content of the broadcast program on the media player is then automatically played, either immediately after being recorded or at the end of playing the one prestored file.

According to another aspect of the present invention, a computer implemented method of selectively recording and playing the content of a broadcast program includes playing on a media player one of a plurality of prestored files which include program content, receiving a broadcast program, and recording at least a portion of content of the broadcast program. It is then determined whether to automatically interrupt the playing of the one prestored file in order to play recorded content of the broadcast program on the media player, or automatically play the recorded content of the broadcast program on the media player after the end of playing the one prestored file.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
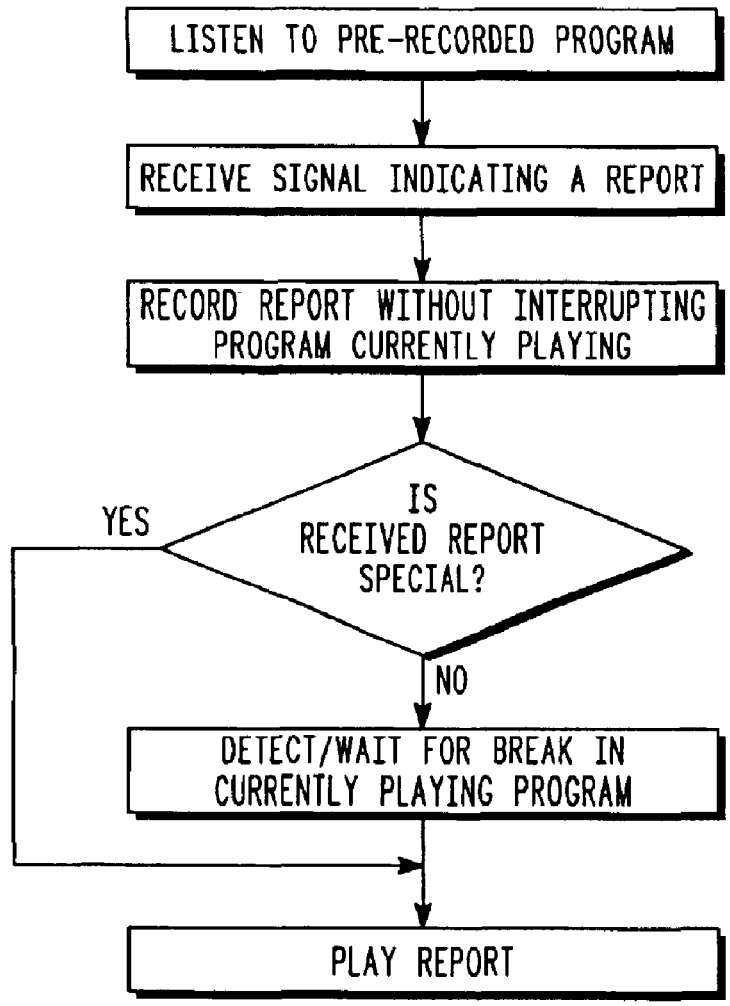
FIG. 1 is a flowchart of one embodiment of the present invention.
Figure 2:
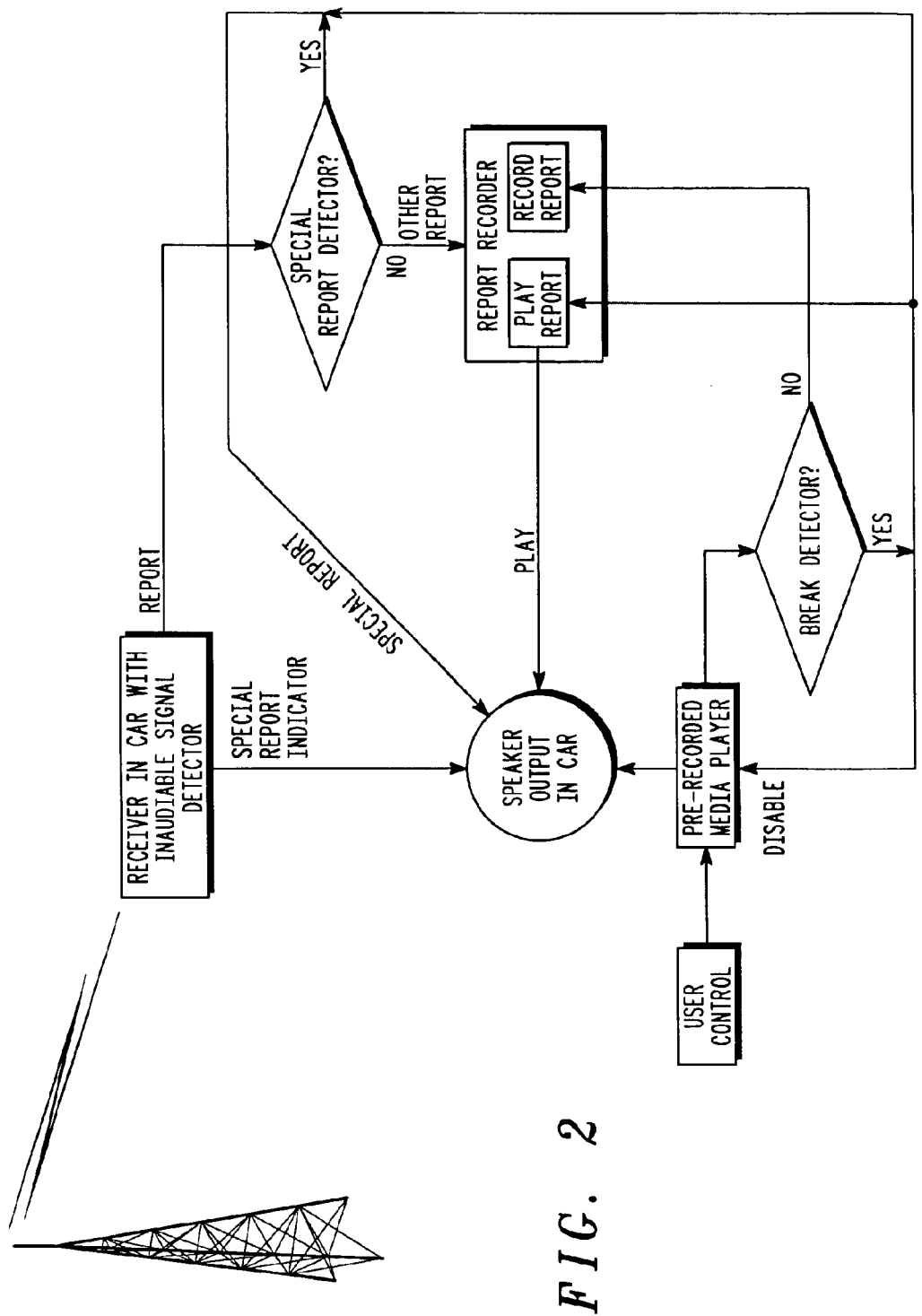
FIG. 2 is a combination flowchart/block diagram showing the functional units, used with the method of FIG. 1.
Figure 3:
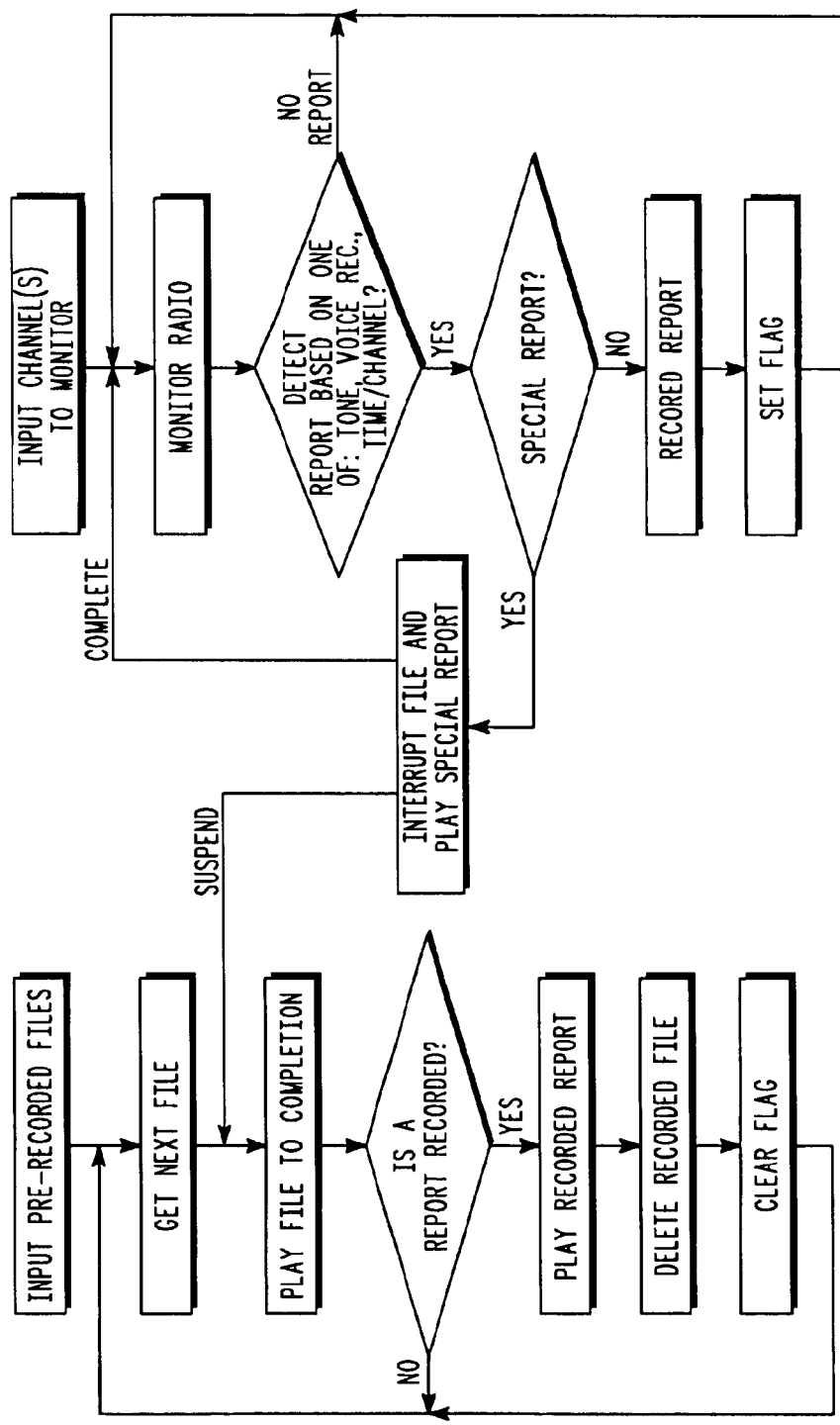
FIG. 3 is a more detailed flowchart of FIG. 1.

FIGS. 1–3 show a computer implemented method of selectively recording and playing the content of a broadcast program according to one embodiment of the present invention. The elements and steps in FIGS. 1–3 are mostly self-explanatory, and thus no detailed discussion of each element and step is provided. Broadcast programs include music, or other audio content traditionally broadcast by radio stations. The broadcast program may also include traffic, weather or other information, which is generally, but not necessarily, presented in a summarized report format for ease of listening by a driver in a vehicle. Such informational reports are generally known in the art, and therefore a detailed discussion thereof is omitted here for convenience only, and should not be considered limiting. Broadcast programs are preferably generated and transmitted by a radio station, although other media outlets, such as television stations, may be the source of a broadcast program without departing from the spirit and scope of the present invention.

The method includes playing one of a plurality of prestored files on a media player. The prestored files include program content, such as music, other types of audio, video or any other media which contains information that may be stored in a variety of known media formats for future playback by a consumer. For example, a CD includes one or more files, or tracks, each containing prerecorded audio in a specified format. The media player used with the present invention may be a tape, CD, DVD or MP3 player or any other media playback device generally known in the art which is capable of playing prerecorded or prestored media files as described above at the request of a consumer. A vehicle may contain any such type of media player connected to the vehicle's speaker system so the driver may listen to the types of prestored files which the media player is capable of playing, in addition to transmissions broadcast from traditional radio stations.

The method further includes receiving a broadcast program, which may or may not include one or more informational reports as described above. The broadcast program is preferably transmitted from a radio or other broadcast station, such that a broadcast receiver in a vehicle within broadcast range is capable of receiving the broadcast program transmitted from that station. Even if the driver is not listening to the broadcast program (because the driver is listening to the prestored file being played on the media player), the broadcast receiver in the vehicle is nonetheless is capable of receiving traditional live programming (i.e., music or other programming) from a broadcast station.

Upon receiving the broadcast program, a determination must be made as to whether a predetermined criteria associated with the broadcast program is met. Stated differently, when a broadcast program is transmitted and received, the broadcast receiver (or another device associated therewith) must determine if the received broadcast program includes an informational report which the driver might want to listen to. Only if certain criteria associated with the broadcast program are satisfied will the broadcast receiver designate the transmission as one containing an informational report. According to a first preferred embodiment, the predetermined criteria may be an inaudible signal, for example, a predetermined tone or series of tones, transmitted preceding an informational report in a broadcast program. The broadcast receiver in the vehicle which receives the broadcast program is also capable of detecting the inaudible signal. If the inaudible signal is recognized by the receiver, the receiver determines that the criteria has been met and that the accompanying broadcast program includes an informational report.

In an alternative embodiment, rather than depending on an inaudible signal from the radio station transmitting the broadcast program, the predetermined criteria associated with the broadcast program may include one or more preset attributes of the broadcast program itself. For example, the time that desired informational reports are broadcast by a given radio station may be used as criteria to trigger the reception and recording of a broadcast program by the broadcast receiver. The driver programs the particular radio station or channel over which to receive broadcast programs, and further specifies a time during which the content (i.e., the desired informational report) of a particular broadcast program received over the selected channel is to be recorded by the broadcast receiver. Thus, the broadcast receiver in the driver's vehicle will record broadcast programs according to the time and channel of the desired informational report. The broadcast receiver can also synchronize with the radio station's time base through speech recognition of the station's time reports. Using this type of time-based model to determine the presence of a broadcast program is less accurate due to the fluctuations in when the report is given due to a radio station's live programming, but also does not require adjustment to the broadcast program by the radio station.

According to another preferred embodiment, the broadcast receiver uses voice recognition to identify particular words which introduce particular types of broadcast programs transmitted by radio stations. For instance, traffic reports are often sponsored and therefore are usually introduced using a sponsor's name, and use the same words to identify the beginning of such a report. When the broadcast receiver detects these introductory words, the predetermined criteria is satisfied, and a broadcast program containing an information report for recording is known to follow.

When the broadcast receiver has determined that the predetermined criteria has been met, at least a portion of the content of the associated broadcast program (i.e., at least the informational report) is automatically recorded by a recording device connected to (or part of) the broadcast receiver in the vehicle. Recording devices are generally known in the art, and may be, for example, any known recording device such that the resulting recording is formatted to be played by the media player. When there is a break in the program content being played from the prestored files on the media player (for example, between songs), the recorded portion of the broadcast program, preferably the informational report, is played on the media player (or another playback device) for the driver to listen to. The recorded informational report preferably will not play on the media player until the prestored file currently playing on the media player has completed. Therefore, the transmission of a broadcast program containing an informational report of interest to the driver will not inconveniently interrupt the playing of a prestored file on the media player that the user is already listening to.

To assure that the driver is alerted to the recorded informational report, after the broadcast receiver has determined that the predetermined criteria has been met and the broadcast program has been recorded, a broadcast flag may be set to indicate that an informational report has been received and recorded and is awaiting playing by the media player. The media player in the vehicle monitors the state of the broadcast flag, such that if the broadcast flag is set, then the media player is disabled from playing the next prerecorded file. Instead, the media player will play the recorded informational report (or surrender control to another device to play the recorded report) after the prerecorded file which is currently playing is complete. After the informational report is played, the broadcast flag is cleared, or reset, until the predetermined criteria associated with a broadcast program is met. The media player then recommences playing another prestored file. Additionally, after the informational report has been played on the media player, the contents of the recorded broadcast program maybe deleted by the recording device or other media storage unit.

In certain circumstances, such as inclement weather conditions or other emergencies, the user may desire to hear informational reports in real time, during actual transmission of the broadcast program containing the special informational report. Thus, in another preferred embodiment of the present invention, the criteria indicating the presence of a informational report may include a "special" signal designating the broadcast program which follows as having a higher priority. For example, if an inaudible signal is utilized to designate an informational report, a special priority tone may be included with the inaudible signal. Upon recognition of a high priority broadcast program, at least a potion of the broadcast program is automatically recorded and the prestored file playing on the media player is automatically interrupted without waiting for completion of the current prestored file so that the emergency or high priority informational report may be immediately played on the media player.

As shown in FIGS. 2 and 3, the embodiments discussed above may be combined, such that the broadcast receiver determines when it is appropriate to i) immediately interrupt the currently playing prestored file and play the recorded informational report; ii) record a portion of the broadcast program; iii) wait until the currently playing prestored file has terminated and play the recorded informational report; or, iv) make no changes and allow the media player to retain control over playing of the prestored files. In such an embodiment, the system may be configured such that the media player is disabled by the special report detector and/or break detector, such that the media player cannot play another prestored file until the broadcast program (having either special report priority or normal priority) has been played.

By incorporating the method according to the present invention with known digital audio technology which is used to play the plurality of prestored files for a user (such as an MP3 player), all of the necessary technology and equipment is already in place to store and record broadcast content that is received by the broadcast receiver from a radio station. Depending on the technology in use, the user may set rules to play the received and recorded broadcast program between songs, as it is received, or at specific times or intervals.

The present invention is not limited to use with a vehicle radio. For example, the method could be applied to a home stereo system which may be connected to a radio receiver, television or other broadcast device. Motorola's simplefi™ system, which provides an interface between a personal computer and a stereo, can also easily be incorporated into the inventive method to provide additional options in playing the prestored files and/or the recorded informational reports.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computer-implemented method of selectively recording and playing the content of a broadcast program, the method comprising:
   (a) playing on a media player one of a plurality of prestored files, the files including program content;
   (b) receiving a broadcast program;
   (c) determining whether a predetermined criteria associated with the broadcast program is met; and
   (d) if the predetermined criteria is met:
      (i) automatically recording at least a portion of content of the broadcast program, and
      (ii) at the end of playing the one prestored file, automatically playing the recorded content of the broadcast program on the media player.

2. The method of claim 1 further comprising:
   (e) deleting the recorded content of the broadcast program after it is played.

3. The method of claim 1 further comprising:
   (e) setting a flag indicating that there is recorded content of a broadcast program that is to be played after the playing of the one prestored file is completed;
   (f) clearing the flag after the recorded content of the broadcast program is played; and
   (g) playing another one of the prestored files.

4. The method of claim 1 wherein step (c) further comprises using voice recognition to determine whether the predetermined criteria is met.

5. The method of claim 1 wherein the predetermined criteria is met when an inaudible tone is detected in the content of the broadcast program.

6. The method of claim 1 further comprising:
   (e) selecting a channel over which to receive and monitor broadcasted programs; and
   (f) specifying a time during which the content of a particular broadcasted program received over the channel is to be recorded.

7. A computer-implemented method of selectively recording and playing the content of a broadcast program, the method comprising:
   (a) playing on a media player one of a plurality of prestored files, the files including program content;
   (b) receiving a broadcast program;
   (c) determining whether a predetermined criteria associated with the broadcast program is met; and
   (d) if the predetermined criteria is met:
      (i) automatically recording at least a portion of content of the broadcast program, and
      (ii) automatically interrupting the playing of the one prestored file and playing the recorded content of the broadcast program on the media player.

8. The method of claim 7 further comprising:
   (e) deleting the recorded content of the broadcast program after it is played.

9. The method of claim 8 further comprising:
   (f) playing another one of the prestored files after the recorded content of the broadcast program is deleted.

10. A computer-implemented method of selectively recording and playing the content of a broadcast program, the method comprising:
    (a) playing on a media player one of a plurality of prestored files, the files including program content;
    (b) receiving a broadcast program;
    (c) recording at least a portion of content of the broadcast program; and
    (d) determining whether to:
       (i) automatically interrupt the playing of the one prestored file in order to play recorded content of the broadcast program on the media player, or
       (ii) automatically play the recorded content of the broadcast program on the media player after the end of playing the one prestored file.

11. The method of claim 10 wherein voice recognition is used while monitoring the broadcast program to make the determination of step (d).

12. The method of claim 10 wherein the detection of an inaudible tone in the content of the broadcast program is used to make the determination of step (d).

* * * * *